United States Patent [19]

Wintle

[11] 4,206,909

[45] Jun. 10, 1980

[54] SLEEVE ASSEMBLY

[76] Inventor: Richard Wintle, 41 Churchward Ave., Swindon, Wiltshire, England

[21] Appl. No.: 897,010

[22] Filed: Apr. 17, 1978

[51] Int. Cl.$^2$ .............................................. B23Q 3/00

[52] U.S. Cl. ........................................ 269/47; 40/316; 101/4; 101/35; 264/132; 264/230; 29/760

[58] Field of Search ..................... 40/316; 101/4, 5, 8, 101/11, 35, 43, 44, 407 R; 264/130, 132, 230; 269/47; 29/745, 760, 747

[56] References Cited

U.S. PATENT DOCUMENTS

| | | | |
|---|---|---|---|
| 2,027,962 | 1/1936 | Currie . | |
| 3,086,242 | 4/1963 | Cook et al. . | |
| 3,449,813 | 6/1969 | Tregubenko | 29/747 |
| 3,721,749 | 3/1973 | Clabburn . | |
| 3,894,731 | 7/1975 | Evans . | |
| 3,985,852 | 10/1976 | Evans . | |
| 4,032,010 | 6/1977 | Evans . | |

*Primary Examiner*—Robert C. Watson
*Attorney, Agent, or Firm*—Lyon & Lyon

[57] ABSTRACT

A support comprising a base and a plurality of projections extending from the base has a plurality of sleeves which are retained on the projections against accidental displacement therefrom, and which are slidable on the projections to permit their removal and installation on an article to be marked. The free end portion of each projection is such that, at least when a sleeve is positioned thereover, there is a cavity into which an end portion of the article to be marked is introduced during installation of the sleeve on the article.

26 Claims, 21 Drawing Figures

SLEEVE ASSEMBLY

BACKGROUND OF THE INVENTION

This invention relates to the provision of markers, for example markers suitable for identifying components of equipment.

Identifying markers for components of complicated equipment are frequently needed, particularly in complex electrical equipment, for example wiring systems in aircraft. As a result of this need, marker sleeves have been developed which are colour coded and/or which include printed indicia for identification of a specific component. Installation of these sleeves is, however, a labour-intensive process.

U.S. Pat. No. 3,894,731, the disclosure of which is incorporated herein by reference, describes an assembly which comprises an elongate spine from at least one side of which transversely project a plurality of spaced tines, and a plurality of tubular sleeves, each of the sleeves being snugly and slidably disposed over one of the tines to allow removal therefrom when withdrawn over the free end of the tine. The sleeves may conveniently be positioned round the tines in a heat-recoverable state and heated to cause them to recover into contact with the tines. Printed information may be impressed on the sleeves on the tines by means of a typewriter, and the sleeves in the assembly may thus readily be provided with a desired marking, for example in a conventional typewriter modified by providing indentations in the platen for receiving and positioning the sleeves. The sleeves can then be removed over the free ends of the tines and positioned on the components to be marked.

Further assemblies suitable for use in installing marker sleeves are disclosed in U.S. Ser. No. 598,412 filed July 23, 1975 in the name of Joseph H. Evans, the disclosures of which are incorporated by reference herein. The latter application, which is a continuation in part of U.S. Ser. No. 369,836, now U.S. Pat. No. 3,894,731, describes an assembly comprising a carrier, the carrier including a base and projections extending from the base and a plurality of tubular sleeves snugly and slidably disposed over the projections, and a number of examples of different forms of the carrier (whereby the assembly may be, for example, more easily stored and transported, more suitable for use with a typewriter, more suitable for large sleeves etc.) are given. An assembly having more than one sleeve on each projection is also described.

Although the assemblies described in the above-numbered patent and application have considerably simplified the marking and installation of marker sleeves, some difficulty was experienced in certain cases, for example when short sleeves were used, in fitting the sleeves satisfactorily over the components to be marked. Thus, for example, some dexterity is required if a short sleeve is to be slipped from the support projection onto the component to be marked without becoming completely free and, possibly, lost.

It is an object of the present invention to provide an assembly, support and method whereby sleeves can conveniently be applied to components to be marked.

BRIEF SUMMARY OF THE INVENTION

The present invention provides an assembly comprising a support comprising a base and a plurality of projections extending from the base, and a plurality of sleeves, each sleeve being disposed over a projection with at least part of the interior of the sleeve in contact with the projection, being retained on the projection against fortuitous displacement therefrom, and being slidable on the projection to allow removal thereof over the free end of the projection, the free end portion of each projection being of such a configuration that, at least in combination with a sleeve positioned thereover and conterminous therewith, there is provided a cavity for receiving an end portion of a further member such that transfer of a sleeve from the projection to the further member is facilitated. The sleeves are so retained on the projections, for example by contact therewith, that they will not for example fall off during normal handling of the assembly, but are slidable so that they can be withdrawn over or pushed off the free ends of the projections when they are to be installed on a recipient member.

The invention also provides an assembly comprising a support comprising a spine from which transversely project a plurality of spaced bars, and a plurality of sleeves, each sleeve being snugly and slidably disposed over a bar to allow removal therefrom over the free end of the bar, the free end portion of each of the bars having an exterior surface for contacting at least part of a sleeve and an interior surface for defining a cavity for receiving an end portion of a further member.

The invention further provides a support for a plurality of sleeves comprising a base and a plurality of projections extending from the base, the free end portion of each projection having an exterior surface for contacting at least part of a sleeve and an interior surface for defining a cavity for receiving the end portion of a further member.

The invention also provides a method of installing a sleeve on a recipient member which comprises inserting an end portion of the recipient member into one end of the sleeve while the sleeve is at least partially positioned on a support comprising a base and a plurality of projections extending from the base, the sleeve being positioned over a projection with at least part of the sleeve in contact with the projection, being retained on the projection against fortuitous displacement therefrom, and being slidable on the projection to allow removal thereof over the free end of the projection, the free end portion of the projection being such that, at least in combination with the sleeve positioned thereover, there is a cavity for receiving the said end portion of the recipient member, the said end portion of the recipient member being inserted into the cavity, and transferring the sleeve from the projection onto the recipient member.

DETAILED DESCRIPTION OF THE INVENTION

In accordance with the invention, the free end portion of each projection in a support comprising a base and a plurality of projections extending therefrom is of such a configuration that, at least in combination with a sleeve positioned thereover and conterminous therewith, there is a cavity for receiving an end portion of a further member. The cavity may merely be formed, for example, by choosing sleeves and end portions of different cross-sectional shapes and/or sizes (thus, for example, the sleeves could be substantially circular in cross-section and the end portions non-circular, for example substantially rectangular, in cross-section), but preferably the end portion is itself shaped to provide the cavity, although in this case also at least one wall of the cavity may be provided by the interior wall of the sleeve.

Advantageously, therefore, the free end portion of each of the projections has an exterior surface which may contact at least part of a sleeve and an interior surface for defining, at least in combination with a sleeve positioned thereover and conterminous therewith, a cavity for receiving the end portion of the further member. Thus, for example, the free end portion of each of the projections may be hollow or may be 'U'-shaped in cross-section. In the preferred case, however, where the projection is substantially flat, the end portion is also substantially flat, the cavity being provided by an indentation in the end of the projection. The indentation may be, for example, V-shaped or rectangular such that there are two arms extending to the free end of the projection. As will be explained in more detail hereinafter, the length of the arms (or the length of the indentation) is advantageously substantially equal to the length of a sleeve.

In a preferred embodiment, each of the projections has at least one substantially flat surface, and each sleeve has a portion congruent with a flat surface of a bar, a substantially flat surface being one such that a sleeve snugly disposed over that surface presents an exterior surface on which a clear impression may be made by means of a typewriter. Where a support is to be used in conjunction with a typewriter it may be advantageous that each projection be curved about an axis of curvature parallel to the direction in which the projection extends so that the projections will fit against the cylindrical platen of a typewriter, the radius of curvature being similar to the radius of a cylindrical platen, and references herein to substantially flat projections and projections with substantially flat surfaces include, inter alia and where appropriate, references to such curved projections and curved surfaces; that is, "substantially flat" does not imply that the surface or projection in question must necessarily be planar, but includes inter alia the case where the surface or projection is shaped to conform to the outer surface of a platen. A curved projection with two "substantially flat" surfaces will thus have one slightly concave surface which in use faces the platen and an opposite slightly convex surface which is use faces the typewriter keys.

If the projections have two opposite substantially flat surfaces and are of substantially rectangular cross-section and of small thickness relative to their width and length (a configuration which is preferred for the projections) sleeves which in the assembly are in snug but slidable conformity with such projections retain their generally flat configuration when removed from the projections. However, when pressure is applied from their opposite sides, they open out to receive a recipient member, for example a wire. Release of pressure causes the sleeves to attempt to assume a generally flat configuration, so that a sleeve grips for example the wire about which it has been disposed much in the manner of a spring clip.

When characters are to be printed for example by a typewriter on one or more sleeves in the assembly of the invention, the heat absorptive characteristics of the characters preferably permit their being rendered indelible by exposure to radiant heat, without unduly discoloring the surrounding unprinted portions of the sleeve, for example the heat absorptivity of the characters may be greater than that of the unprinted portions. Thus, one indicia have been printed on a sleeve or sleeves, the assembly can be conveyed past, for example, an infrared source, effectively and indelibly "burning" the characters into the substance of the sleeve(s).

In the preparation of the assembly of the invention, the sleeves are preferably positioned round the projections in a heat-recoverable state and heated to cause them to recover into contact with the projections. If it is desired that a portion of the interior of a sleeve should not contact the respective projection, at least one mandrel may be used to control the recovery of the sleeve, the mandrel(s) being removed after recovery has been effected. Where heat-recoverable sleeves are used in the preparation of the assembly, these may be so chosen (by appropriate choice of the interior circumferential dimensions of the sleeves before expansion to the heat-recoverable state) so that, while recovery results in contact between the sleeves and the projections such that the sleeve is retained in the projection against fortuitous displacement therefrom, the sleeves do not recover further to any significant extent when removed from the bars and raised to their recovery temperature again. Alternatively, however, where it is desired that a sleeve once free of its projection and disposed over a recipient member be heat-recoverable to smaller dimensions, this may be achieved by using sleeves, which, before expansion to the heat-recoverable state, have interior circumferential dimensions smaller than the exterior circumferential dimensions of the relevant projections. In such cases further recovery of the sleeves if they are subjected to radiant heat in the course of rendering printed indicia indelible may be prevented by the projections.

Generally, the heat-recoverable sleeves which may be used in preparing the assembly of the invention are heat-recoverable to an interior circumferential dimension corresponding to about half the exterior circumferential dimension of the projections to about the exterior circumferential dimension of the projections, depending on whether or not further recovery is required once the sleeves are disposed about a recipient member.

When heat-recoverable sleeves are used in preparing the assembly, the material of the support is chosen to withstand exposure to the temperature of sleeve recovery and where it is desired that sleeves be further heat-recoverable when removed from their projection supports, is made sufficiently rigid to withstand recovery forces without substantial deflection. At the same time, it is preferred that the material be sufficiently flexible that, when the support is appropriately shaped, it can be placed around the platen of a conventional typewriter. When the sleeves borne by the support are to be exposed to relatively greater temperatures in order to render printed characters thereon indelible, the support preferably has a high heat deflection temperature. However, most of that portion of the support not covered by the sleeves recovered thereon is heat-shielded during the indelibilization process, so that the support does not reach the temperatures of the magnitude reached by the exposed sleeve surface. The preferred support material is nylon 66, although those skilled in the art will readily appreciate that many other materials may be used, for example, stiff cardboard, flexible metal stock, etc. The projections are preferably integral with the carrier element of the support, and in such a case the carrier is cut from sheet stock in a direction insuring that any burrs are directed away from the surface adjacent the recovered sleeve surface upon which printing is to be effected. Otherwise, it may be that, in the course of typing, portions of the sleeve will be impaled on the burrs, making removal of the sleeve from its supporting projection somewhat difficult.

A release agent may be coated on the support or coated on the interior of the sleeves. Where a lubricious release material is used, it is preferably one which is either not volatilized during indelibilization or one whose volatile by-products are not harmful. A preferred release agent or lubricant is a mixture of 95 parts by weight trichloroethane and 5 parts by weight silicone stopcock grease, for example that available from the Dow Corning Corporation.

Heat-recoverable sleeves used according to the invention may be formed from any material capable of having the property of heat-recoverability (sometimes referred to as plastic or elastic memory) imparted thereto, preferably a polymeric material. A heat-recoverable article has preferably been dimensionally changed from an original heat-stable configuration to a dimensionally heat-unstable configuration, in which case it tends to move in the direction of the original configuration upon the application of heat alone. As is made clear in U.S. Pat. No. 2,027,962, the original, dimensionally heat stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage. The terms "plastic memory" and "elastic memory" are used interchangeably herein and are intended to be mutually inclusive. Examples of materials which may be converted to a heat-recoverable state and of methods for imparting recovery thereto are found in Currie, U.S. Pat. No. 2,027,962, Cook et al, U.S. Pat. No. 3,086,242, and Clabburn, U.S. Pat. No. 3,721,749, the disclosures of which are incorporated herein by reference. In other articles, as described, for example, in U.S. Ser. No. 285,567 filed June 10, 1977, now U.S. Pat. No. 4,035,534 in the name of David D. Nyberg, the disclosure of which is incorporated by reference herein, an elastomeric member such as an outer tubular member is held in a stretched state by a second member, such as an inner tubular member, which, upon heating, weakens and thus allows the elastomeric member to recover.

One method of imparting the property of heat-recoverability to a material comprises exposing a thermoplastic material to an amount of heat which is insufficient to allow the material to melt but sufficient to allow the molecular structure to become distorted, distorting the material to a new configuration, and cooling the material in its distorted state. Subsequent increases in temperature sufficient to reduce locked-in stresses caused by the initial plastic deformation will cause the article to tend to recover to its initial state.

Another manner in which heat-recoverable articles may be made involves the information of a polymeric article having a first dimension, followed by crosslinking of the polymer. The crosslinking can be effected by chemical means, for example, with peroxides, or by irradiation or by combinations of the two. Radiation employed can be of various types including charged particles, i.e., beta and alpha, neutral particles, i.e., neutrons, and electromagnetic, i.e., gamma and ultraviolet, as is well known. Subsequent heating of the material will melt the crystals in a crystalline thermoplastic material or significantly lessen other internal molecular forces such as hydrogen bonding or dipole-dipole interactions to an extent sufficient to allow distortion of the product. Upon cooling of the heated and distorted article, there is obtained a product which remains in its distorted shape while at room temperature, due to the reformation of strong interchain forces such as crystallinity which at low temperatures dominate the contrary stresses resulting from crosslinking. Upon reheating, the crosslink forces become dominant and the material tends to recover to its original geometry. When irradiation is used, doses of any desired amount can be used although, generally, a dosage of from 5 to 50, preferably 20 to 25 megarads will be sufficient.

As examples of the polymeric materials to which heat-recoverability can be imparted by the above and other means may be mentioned polyolefins, preferably crystalline crosslinked polyolefins. Especially suitable materials include, for example, polyethylene, polybutene, various copolymers of ethylene, propylene and butene, polyvinyl halides, for example, polyvinyl chloride; ionomers and polyurethanes.

For printability, the polymeric material of which a recoverable sleeve is formed desirably contains a substantial proportion of filler material. The preferred sleeve material contains 40 parts by weight low density polyethylene, 15 parts by weight ethylene-ethylene acrylate copolymer, 8 parts by weight white pigment, 31 parts by weight flame-retardant, and 6 parts by weight antioxidant. The recovery temperature of a sleeve so composed is about 105° to 110° C.

Typewritten information contained on sleeves formed of the foregoing preferred composition may be rendered indelible by exposing the support-borne sleeves to a quartz tungsten filament lamp for a short period (for example, approximately 0.7 seconds) during which time the temperature of the printed portions of the sleeves is believed to have been raised to ca. 315° C.; those skilled in the art of plastics printing are well able to determine what times and temperatures will suffice for a given material.

In accordance with the invention, each projection advantageously has a plurality of sleeves thereon, or a single sleeve scored such that individual short sleeves may readily be separated therefrom. Even where a projection has a plurality of individual sleeves thereon these are advantageously produced by cutting a single sleeve on the projection into a plurality of shorter sleeves.

DETAILED DESCRIPTION OF THE DRAWINGS

Figure 1:
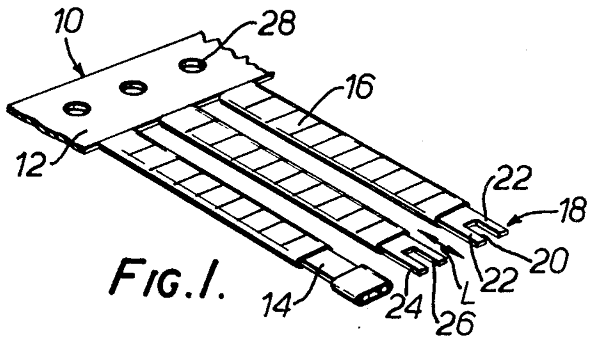
FIG. 1 is a perspective view of an assembly consturcted according to one embodiment of the invention.

Referring now to the drawings, FIG. 1 shows a support 10 comprising an elongate spine 12 from one side of which project a plurality of spaced apart bars 14, each bar having a flat, planar surface which is coplanar with corresponding surfaces of the other bars when the spine is flat. In a further embodiment, not illustrated, bars extend from each side of the spine, facilitating typing of information on the so aligned sleeve pairs borne by the oppositely extending bars. In FIG. 1, a plurality of substantially flat sleeves 16 are disposed on each bar 14, the sleeves snugly conforming to the flat bars and being slidable on the bars to allow ready removal therefrom when drawn past the free ends of the bars. The sleeves 16 may be installed on the bars by positioning a relatively long heat-recoverable sleeve over each bar and recovering the sleeves into contact with the bars, the sleeves then being cut into shorter lengths while on the bars. Preferably a release agent is disposed between the sleeves and the bars, for example by dip-coating the bars with such an agent or by nip-coating with such an agent the interior of a tubular member from which the long sleeves are subsequently cut.

The free end portion 18 of each bar 14 has a rectangular indentation 20 therein such that there are two arms 22 extending to the free end of the bar. The end portion 18 thus has an exterior surface 24 for contacting a sleeve 16 and an interior surface 26 which defines a cavity for receiving an end portion of a further member, for example a cable, on which a sleeve is to be installed. The length L of the arms 22 is preferably substantially equal to the length of a sleeve 16 so that, when a sleeve is positioned over the arms, the end portion of the further member can be inserted into the entire length of the sleeve; if the length L were appreciably longer than the length of the sleeve, the end portion could be unduly weakened without any significant improvement resulting therefrom. The preferred length of the arms indicated above will normally also mean that the arms, and thus the opposite edges of a flat sleeve positioned over them, can be squeezed together somewhat such that the mid portions of sleeve bow out, facilitating insertion of the further member into the cavity.

The support used in accordance with the invention thus makes it possible to insert an end portion of the member, for example an electrical component, on which the sleeve is to be installed into the sleeve before the latter has been removed from the support projection or bar. The sleeve can thus be transferred from the bar to the recipient member more simply and reliably than was possible with previously proposed supports.

An advantage of the support shown in FIG. 1 is that printed information can readily be imparted to the sleeves. For example, the platen of a conventional typewriter need be modified essentially only in that indentations are cut in the hard rubber surface of the platen to receive and position the sleeves for presentation to the typewriter keys and additionally, if desired as an aid to registration, the platen is provided with a sprocket wheel whose teeth are capable of engaging a train of perforations 28 disposed along the length of the spine 12. Thus with minor modification, a conventional typewriter platen can be configured for rapid printing of identifying information on the marker sleeve assembly. The unindented portion of the platen can be used for conventional typing or an unmodified platen can be substituted by the typist whenever conventional typing is required.

Figure 2:
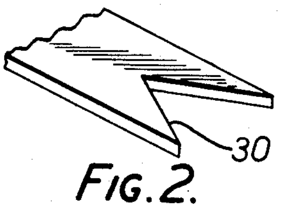
FIGS. 2 and 3 are perspective views of alternative configurations for the end portion of support bars according to the invention.
Figure 3:
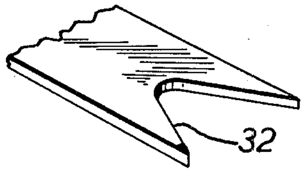
Figure 4:
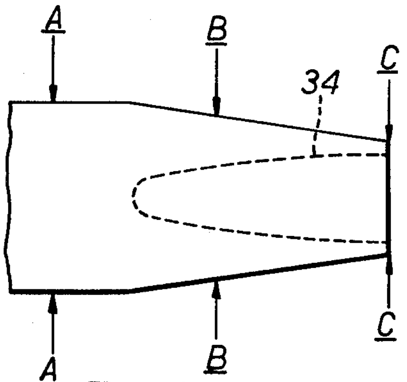
FIG. 4 is a plan view of a further configuration for the end portion of a support bar.
Figure 5:
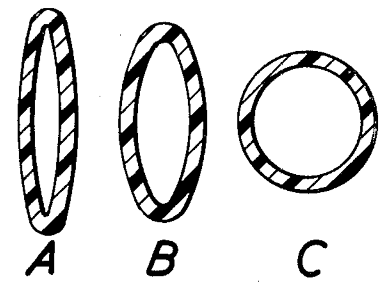
FIG. 5 shows the way in which the cross-section of a sleeve (not shown in FIG. 4) changes as it is moved over the support bar of FIG. 4 from A to B to C with the inner surface of the sleeve in contact with the bar.

FIGS. 2 to 6 illustrate alternative configurations for the end portions of support bars on an assembly according to the invention. In FIG. 2, the free end portion has a V-shaped indentation 30, while in FIG. 3 the indentation is 'U'-shaped. In each of FIGS. 2 and 3, the indentation functions in essentially the same way as the rectangular indentation in FIG. 1. The bar shown in FIGS. 4 and 5 has an end portion which is circular in cross-section and is hollow such that, in use, the end portion of the recipient member can be inserted into the hollow portion 34.

Figure 6:
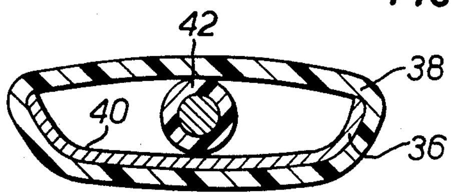
FIG. 6 is a cross-section through the end portion of yet another support bar according to the invention, the end portion having a sleeve positioned thereover and a cable end being received in the sleeve.

FIG. 6 shows an arrangement wherein the end portion 36 of the bar is U-shaped in cross-section. As can be seen from FIG. 6, when a sleeve 38 is positioned over the end portion 36, the sleeve and the interior wall 40 of the end portion define a cavity into which a cable 42 can be inserted.

Figure 13:
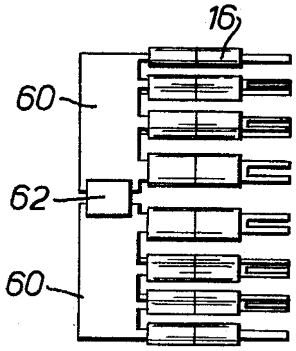
FIG. 13 is a plan view of a further embodiment of the assembly of the invention.

A support in which projections are curved about an axis of curvature oriented parallel to the direction of the projection is illustrated in FIG. 13 of U.S. Ser. No. 598,412, now U.S. Pat. No. 4,032,010, the advantage of the latter arrangement being that the projections will fit against the cylindrical platen of a typewriter, for which purpose the radius of curvature should be similar to the radius of a cylindrical platen (i.e. large relative to the width of an individual projection). It is stated that sleeves mounted on the curved projections are forced to assume a curved configuration when heat-recovered around the projections, and there is no suggestion in U.S. Ser. No. 598,412 that a cavity of the type shown in FIG. 6 (i.e. a cavity of such a size that it can receive a recipient member on which a sleeve is to be installed) should be defined by the projection and the sleeve.

Figure 7:
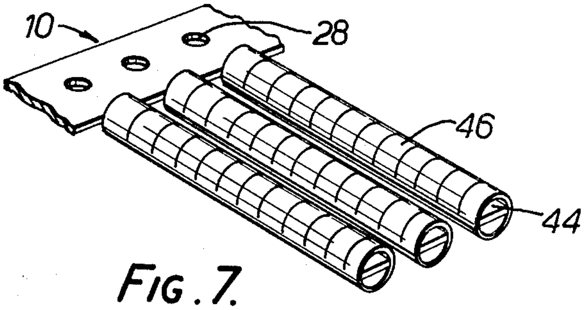
FIG. 7 is a perspective view of part of a further assembly according to the invention.

FIG. 7 shows an assembly in which the support 10 is similar to that in FIG. 1 except for the fact that the free end portions 44 of the support bars do not have indentations therein. In this embodiment, the sleeves 46 positioned on the bars are of substantially circular cross-section and are in contact with the edges of the bars to prevent accidental removal of the sleeves from the bars while being slidable on the bars to permit their forcible removal from the bars. In this embodiment the further member on which a sleeve is to be installed can be inserted in either of the cavities of substantially semi-circular cross-section defined by a surface of the bar and the interior surface of the sleeve.

The arrangement of FIG. 7 differs from that in FIG. 1 of U.S. Pat. No. 3,894,731 in that FIG. 1 of the latter patent shows an intermediate stage in the production of the assembly of FIG. 2 of that patent, and although in FIG. 2 the sleeves are retained on the tines against accidental displacement therefrom, there is no suggestion that this should be the case in FIG. 1. Indeed, in the situation illustrated in FIG. 1, where heat-recoverable sleeves are subsequently to be shrunk round the substrates, the heat-recoverable sleeves would be "oversized" such that they can be slipped over the substrates with minimum effort, and such sleeves would not, of course, be retained on the tines against accidental displacement therefrom.

Figure 8:
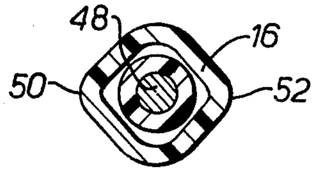
FIGS. 8 and 9 are cross-sections through an electrical conductor and illustrate the retentive spring-action of marker sleeves of an assembly according to one embodiment of the invention.
Figure 9:
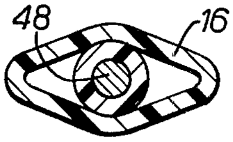
Figure 10:
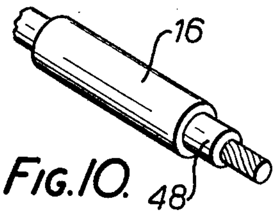
FIG. 10 is a perspective view of a marker sleeve installed according to the present invention which has been heat-recovered on an article.

FIGS. 8 and 9 illustrate the retentive spring action of a substantially flat marker sleeve 16 of the type shown in FIG. 1 when disposed about an electrical conductor 48. With reference to FIG. 8, imposition of pressure on opposite edges 50 and 52 of the sleeves causes its mid-portions to bow out, permitting insertion of a conductor 48. When pressure is released, the flexible sleeve clamps the conductor 48 so that while on the one hand it is retained during handling of conductor 48 on the other it may be readily rotated about the conductor to present the information it bears to any desired direction. FIG. 10 illustrates a heat-recoverable marker sleeve 16 recovered around a conductor 48.

FIGS. 11 to 19 show alternative forms for the support used according to the invention. It will be understood that these Figures illustrate primarily different forms of base and projections and that, where appropriate, the end portions of the projections may have any suitable form in accordance with the invention.

Figure 11:
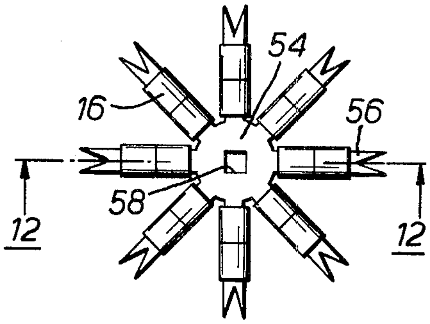
FIG. 11 is a plan view of a further embodiment of the assembly of the invention.
Figure 12:
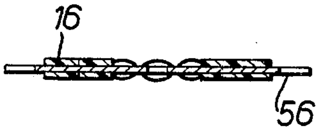
FIG. 12 is a cross-section taken on the line 12—12 of FIG. 11.

FIGS. 11 and 12 shows a support 54 which is in the shape of a circular disc with radial projections 56 extending to bear the marker sleeves 16. A hole 58 is centrally provided in the support 54 for retaining and manipulating the assembly. The hole 58 is shown to be other than circular in order that the carrier may be indexed about an axis extending through the hole. The carrier may again by nylon 66 or material of a stiffer nature.

Figure 14:
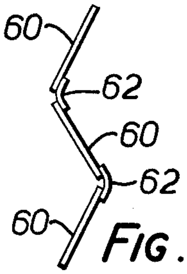
FIG. 14 is an end view of the embodiment of FIG. 13.
Figure 15:
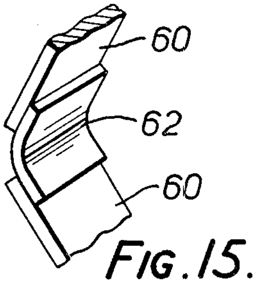
FIG. 15 is an enlarged perspective view of part of the assembly of FIG. 13, showing the hinge.

FIGS. 13, 14 and 15 illustrate an assembly including rigid supports 60 hinged together at 62. The rigid supports 60 may be of any convenient length such that the entire assembly may be folded for transportation and storage. The hinge 62 may be of any common type; a flexible single piece plastic hinge is illustrated here. Special typewriters are available for typing on rigid, flat surfaces such as the individual supports 60 of the embodiment of FIGS. 13, 14 and 15.

Figure 16:
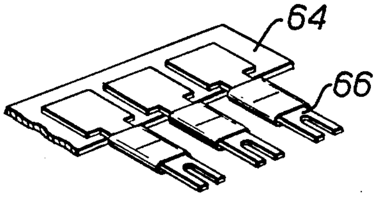
FIG. 16 is a perspective view of part of a further assembly according to the invention.

FIG. 16 illustrates a further embodiment of the present invention including a support 64 wherein projections 66 are separately provided and are conveniently affixed to the spine by such means as a mastic or the like. In this way the pitch of the projections may be varied and different sleeves from separate sources may more easily be provided to the carrier already on the projection 66 from separate sources.

Figure 17:
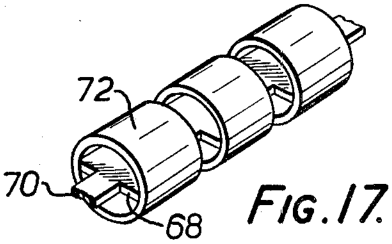
FIG. 17 is a perspective view of part of a further embodiment of the invention.
Figure 19:
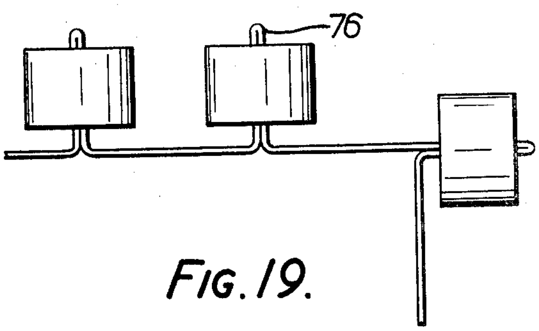
FIG. 19 is a side view of another embodiment illustrating a modification of the embodiment of FIG. 18.
Figure 18:
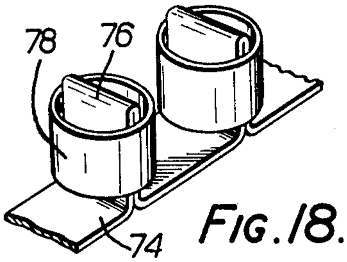
FIG. 18 is a perspective view of yet another embodiment of the invention.

FIGS. 17, 18 and 19 illustrate embodiments where relatively large marker sleeves are loaded on a support. In each case the sleeves are retained on the projections in the manner described in connection with FIG. 7. In FIG. 17, projections 68 extend on either side of a spine 70 as a means for increasing the lateral dimension of the support. The sleeves are positioned around the wide portions of the support. To remove a sleeve 72 from the support, the spine 70 may be readily severed between projections 68 and the sleeves 72 then removed by drawing each sleeve 72 along the support past the severed portion thereof.

In FIG. 18, the support 74 is folded to provide the projections 76 for receipt of sleeves 78. The embodiment in FIG. 18 allows the projections 76 to be folded against the main path of the support 74 for convenient packaging. If such a system is desired, it is beneficial to have the pitch of the projections 76 at least as great as the length of each projection 76. In this way, the sleeves may fold against intermediate portions of the support without interfering with each succeeding sleeve.

FIG. 19 illustrates a modification of the embodiment of FIG. 18 in that the intermediate carrier portions between succeeding projections 76 are reduced to a minimum allowing only a section necessary to create a proper hinge between succeeding projections 76. As in FIG. 18, the support is made from one continuous strip of material. The embodiment in FIG. 19 is most convenient for storage but is not convenient for being printed upon by a conventional typewriter.

Figure 21:
FIG. 21 is a cross section through a curved projection.
Figure 20:
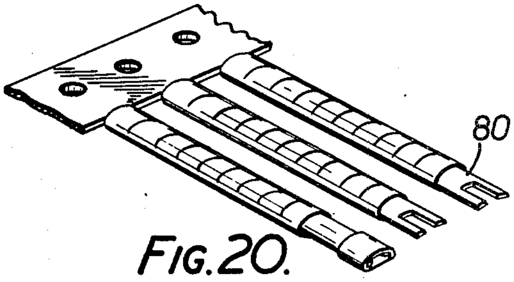
FIG. 20 is a perspective view of a support with curved projections.

FIG. 20 shows a support in which the projections 80, one of which is shown in cross-section in FIG. 21, are curved about an axis of curvature oriented parallel to the direction of the projection 80. The advantage of having such arcuate projections is that the projections will fit against the cylindrical platen of a typewriter. Naturally, the radius of curvature should be similar to the radius of a cylindrical platen.

Thus, a number of embodiments of the assembly and support of the invention are disclosed. These various assemblies and supports find great utility in the facility with which sleeves may be removed for positioning on an article to be marked. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. An assembly comprising a support comprising a base and a plurality of projections extending from the base, and a plurality of sleeves, each sleeve being disposed over a projection with at least part of the interior of the sleeve in contact with the projection, being retained on the projection against fortuitous displacement therefrom, and being slidable on the projection to allow removal thereof over the free end of the projection, the free end portion of each projection being of such a configuration that, at least in combination with a sleeve positioned thereover and conterminous therewith, there is a cavity for receiving an end portion of a further member.

2. An assembly as claimed in claim 1, wherein each sleeve is substantially circular in cross-section and at least the end portion of each of the projections is of non-circular cross-section.

3. An assembly as claimed in claim 2, wherein each of the projections is of substantially rectangular cross-section throughout its length.

4. An assembly as claimed in claim 1, wherein the free end portion of each of the projections has an exterior surface for contacting at least part of a sleeve and an interior surface for defining, at least in combination with a sleeve positioned thereover and conterminous therewith, a cavity for receiving the end portion of the further member.

5. An assembly as claimed in claim 4, wherein the free end portion of each of the projections is hollow.

6. An assembly as claimed in claim 1, wherein at least one of the projections has a plurality of said sleeves disposed thereover.

7. An assembly as claimed in claim 1, wherein the base is an elongate spine and the projections are bars which extend transversely from the spine.

8. An assembly as claimed in claim 7, wherein each bar is curved about an axis of curvature which extends parallel to the direction in which the bar extends.

9. An assembly comprising a support comprising a base and a plurality of projections extending from the base, and a plurality of sleeves, each sleeve being disposed over a projection with at least part of the interior of the sleeve in contact with the projection, being retained on the projection against fortuitous displacement therefrom, and being slidable on the projection to allow removal thereof over the free end of the projection, the free end portion of each projection having an indentation therein thereby providing an exterior surface for containing at least part of a sleeve and an interior surface for defining, at least in combination with a sleeve positioned thereover and conterminous therewith, a cavity for receiving the end portion of a further member.

10. An assembly as claimed in claim 9, wherein the indentation is substantially 'V'-shaped.

11. An assembly as claimed in claim 9, wherein the indentation is substantially rectangular.

12. An assembly as claimed in claim 11, wherein the length of the indentation is substantially equal to the length of a sleeve.

13. An assembly comprising a support comprising a spine from which transversely project a plurality of spaced bars, and a plurality of sleeves, each sleeve being snugly and slidably disposed over a bar to allow removal therefrom over the free end of the bar, the free end portion of each of the bars having an exterior surface for contacting at least part of a sleeve and an interior surface for defining a cavity for receiving an end portion of a further member.

14. An assembly as claimed in claim 13, wherein each of the bars is substantially flat.

15. An assembly as claimed in claim 14, wherein each of the sleeves is substantially flat.

16. An assembly as claimed in claim 15, wherein the sleeves substantially retain their configuration on removal from the bars.

17. An assembly as claimed in claim 13, wherein the sleeves are heat-shrinkable.

18. An assembly as claimed in claim 13, wherein at least one of the projections has a plurality of said sleeves disposed thereover.

19. An assembly as claimed in claim 13, wherein a surface of at least some sleeves bears printed information.

20. An assembly providing a support comprising a spine from which transversely project a plurality of spaced bars, and a plurality of sleeves, each sleeve being snugly and slidably disposed over a bar to allow removal therefrom over the free end of the bar, the free end portion of each of the bars having an indentation therein such that there are two arms extending to the free end which provide an exterior surface for contacting at least part of a sleeve and an interior surface for defining a cavity for receiving an end portion of a further member.

21. An assembly as claimed in claim 20, wherein the indentation is substantially 'V'-shaped.

22. An assembly as claimed in claim 20, wherein the indentation is substantially rectangular.

23. An assembly as claimed in claim 22, wherein the length of the indentation is substantially equal to the length of a sleeve.

24. An assembly as claimed in claim 23, wherein each of the bars has at least one substantially flat surface and each sleeve has a portion congruent with a substantially flat surface of a bar.

25. An assembly comprising a support comprising a base and a plurality of projections extending from the base, and a plurality of sleeves, each sleeve being disposed over a projection with at least part of the interior of the sleeve in contact with the projection, being retained on the projection against fortuitous displacement therefrom, and being slidable on the projection to allow removal thereof over the free end of the projection, the free end portion of each projection being substantially 'U'-shaped in cross-section thereby providing an exterior surface for contacting at least part of the sleeve and an interior surface for defining, at least in combination with a sleeve positioned thereover and conterminous therewith, a cavity for receiving the end portion of a further member.

26. An assembly comprising a support comprising a base and a plurality of projections extending from the base, and a plurality of sleeves, each sleeve being disposed over a projection with at least part of the interior of the sleeve in contact with the projection, being retained on the projection against fortuitous displacement therefrom, and being slidable on the projection to allow removal thereof over the free end of the projection, the free end portion of each projection being substantially 'V'-shaped in cross-section thereby providing an exterior surface for contacting at least part of a sleeve and an interior surface for defining, at least in combination with a sleeve positioned thereover and conterminous therewith, a cavity for receiving the end portion of a further member.

* * * * *